US008160375B2

(12) United States Patent
Sundstrom (10) Patent No.: US 8,160,375 B2
(45) Date of Patent: Apr. 17, 2012

(54) METHOD, COMPUTER PROGRAM PRODUCT, AND HARDWARE PRODUCT FOR IMPLEMENTING LOSSLESS IMAGE COMPRESSION BY MINIMIZING COMPLEX STRUCTURES USING INTELLIGENT PIXEL CRAWLING

(75) Inventor: Martin Sundstrom, KBH OE (DK)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 12/210,591

(22) Filed: Sep. 15, 2008

(65) Prior Publication Data
US 2010/0067813 A1 Mar. 18, 2010

(51) Int. Cl.
*G06K 9/36* (2006.01)
*G06K 9/46* (2006.01)
(52) U.S. Cl. ..................................... 382/244
(58) Field of Classification Search .......... 382/224, 382/232, 238–244; 375/240.02, 240.03; 348/384, 408, 409, 415, 420; 341/51, 67, 341/99, 106, 107; 345/421, 422; 709/200
See application file for complete search history.

(56) References Cited

U.S. PATENT DOCUMENTS

| 5,825,363 | A | * | 10/1998 | Anderson | 345/422 |
| 6,038,346 | A | | 3/2000 | Ratnakar | |
| 6,865,298 | B2 | | 3/2005 | Li | |
| 2006/0282494 | A1 | * | 12/2006 | Sima et al. | 709/200 |
| 2010/0067813 | A1 | * | 3/2010 | Sundstrom | 382/244 |

OTHER PUBLICATIONS

V. Ratnakar; "RAPP: Lossless Image Compression with Runs of Adaptive Pixel Patterns;" IEEE 1998; pp. 1251-1255.

* cited by examiner

*Primary Examiner* — Amir Alavi
(74) *Attorney, Agent, or Firm* — Cantor Colburn LLP; Jean Sullivan (57) ABSTRACT

Lossless image compression is performed by receiving and opening an original image file representing an image. A pixel path is determined in the image by analyzing one or more complex structures in the image. The one or more complex structures are represented using a mathematical expression. Each of the pixels along the determined pixel path is replaced to minimize the complex structure, thus providing a compressed image file having a smaller file size than the original image file. A comment is inserted in the compressed image file specifying the determined pixel path. The compressed image file is stored on a computer-readable storage medium.

20 Claims, 8 Drawing Sheets

METHOD, COMPUTER PROGRAM PRODUCT, AND HARDWARE PRODUCT FOR IMPLEMENTING LOSSLESS IMAGE COMPRESSION BY MINIMIZING COMPLEX STRUCTURES USING INTELLIGENT PIXEL CRAWLING

TRADEMARKS

IBM® is a registered trademark of International Business Machines Corporation, Armonk, N.Y., U.S.A, and other countries. Other names used herein may be registered trademarks, trademarks or product names of International Business Machines Corporation or other companies. The IBM Logo is a registered trademark of International Business Machines Corporation, in the U.S.A and in other countries.

BACKGROUND

This invention relates to the field of file compression and, in particular, to methods, computer program products, and hardware products for implementing no-loss compression of image files.

Efficient storage and transmission of electronic images typically requires some sort of compression. Compression techniques are generally referred to as lossless or lossy. Lossless compression means that a resulting image is identical to its input image. Lossy compression techniques may have some variation between the resulting (or output) image and the input image. The amount of variation between the input image and the output image is determined by the quality of the compression technique. The overall amount of compression achieved is determined by the efficiency of the compression technique. Generally, lossless techniques have not achieved as high an efficiency as lossy techniques.

Examples of image compression techniques are wide and varied, but some lossless techniques use patterns of previously-coded neighboring pixels to predict and code each pixel. Typically, the four immediate and previously-coded neighbors of the current pixel are used, including a pixel immediately to the left of the current pixel, a pixel immediately above and diagonally to the left of the current pixel, a pixel immediately above the current pixel, and a pixel immediately above and diagonally to the right of the current pixel. These previously-coded neighbors are used to determine an augmented pattern of the current pixel. The augmented pattern includes a character and a label for each previously coded pixel. The character specifies the number of times the value of that previously-coded neighboring pixel is repeated in its corresponding direction. The label identifies which of the previously coded neighboring pixels are identical. A label for the current pixel is then predicted based upon a comparison of the determined probability for each label of the previously coded neighboring pixels. By considering a set of neighboring pixels in this manner, substantial computing power is required, yet at the same time, the compression efficiency of these techniques is limited. Accordingly, what is needed is an improved technique for performing lossless image compression.

SUMMARY

A method for implementing lossless image compression receives and opens an original image file representing an image. A pixel path is determined in the image by analyzing one or more complex structures in the image. The one or more complex structures are represented using a mathematical expression. Each of the pixels along the determined pixel path is replaced to minimize the complex structure, thus providing a compressed image file having a smaller file size than the original image file. A comment is inserted in the compressed image file specifying the determined pixel path. The compressed image file is stored on a computer-readable storage medium.

Computer program products and hardware products corresponding to the above-summarized methods are also described and claimed herein. Other methods, hardware products, and/or computer program products according to embodiments will be or become apparent to one with skill in the art upon review of the following drawings and detailed description. It is intended that all such additional methods, hardware products, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

In overview, the lossless image compression techniques disclosed herein are able to compress an image, such as a single digital JPG or GIF image, with no loss. These techniques are based upon a realization that intelligence may be incorporated into the compression process based on the structures and content of the image. More specifically, the compression application analyzes an image and determines a pixel crawling path which corresponds to one or more complex structures in the image. After the image is analyzed, one or more complex structures of the image are minimized through the use of intelligent pixel replacement (IPR). By minimizing these complex structures, the overall resulting image file size will be smaller. As a practical matter, an image often contains regions of exactly the same color, with the effect that two or more similar pixels are often neighbors. These neighboring identical pixels are colored with a special color, only leaving one originally colored pixel in related subsets of an image. When monochrome areas neighbor each other, the border between them normally created by color difference will be removed and hence the border or complex structures in an image can be reduced.

Figure 1:
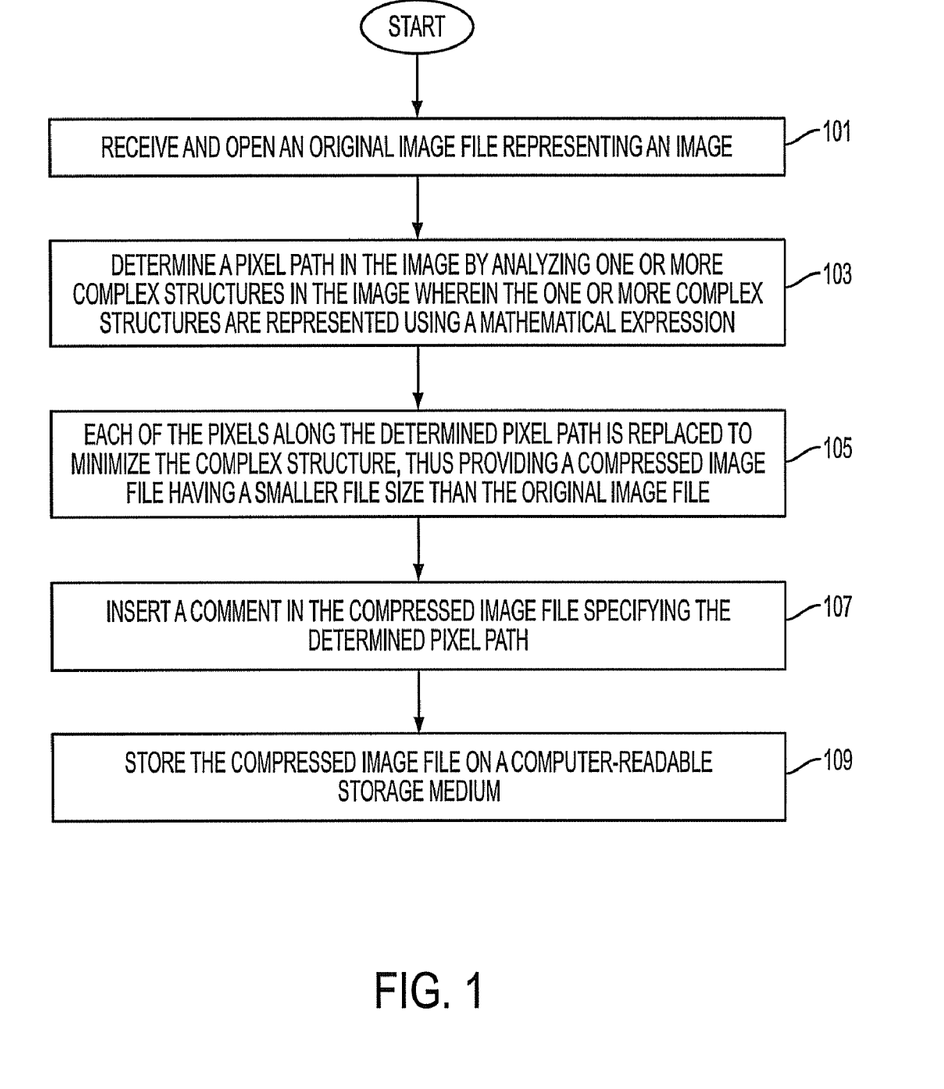
FIG. 1 is a flowchart setting forth an illustrative operational sequence for implementing lossless image compression.

FIG. 1 is a flowchart setting forth an illustrative operational sequence for implementing lossless image compression. The procedure commences at block 101 where an original image file representing an image is received and opened. Next, at block 103, a pixel path is determined in the image by analyzing one or more complex structures in the image. The one or more complex structures are represented using a mathematical expression. Each of the pixels along the determined pixel path is replaced to minimize the complex structure, thus providing a compressed image file having a smaller file size than the original image file (block 105). A comment is inserted in the compressed image file specifying the determined pixel path (block 107). The compressed image file is stored on a computer-readable storage medium (block 109). At block 109, the compressed image file may, but need not, be saved by changing the file extension of the original image file to .ipr (intelligent pixel replacement file extension name), signifying that the file can be viewed as a digital image. The no-loss compression technique described in FIG. 1 may be referred to as no-loss image compression by IPR, or as an IPR compression method.

The analysis of the image at block 103 (FIG. 1) can be performed by moving along a specially determined path one pixel at the time. This technique will be referred to hereinafter as pixel crawling. The path chosen is a result of an analysis of the structures located in the original image. If an image, for example, contains many structures along lines which can be described by a mathematical expression, whether linear or nonlinear, the path by which the pixels will be replaced is then defined according to the mathematical expression. For illustrative purposes, a basic path may originate from the top right pixel in an image and move from the right one line at a time. When the pixel crawling encounters a new pixel which is identical to the immediately preceding pixel, then the new pixel is termed a friendly pixel. Optionally, before the analysis step of block 103 is performed, the file format can be checked to ensure the file is of a valid format and contains no other pixel path comments.

At block 105, each of the pixels along the determined pixel path may be replaced with a pixel having a predetermined color to minimize the complex structure. The predetermined color of the replacement pixel (also termed the "replacement color") is one which is not already present in the image and one closest to black in order to minimize the representation of the color code of each replacement pixel in the image file. A square image with black and white stripes will have another color added but the largest part of the image will be stripped of structures. The no loss image compression procedure of FIG. 1 may be advantageously employed on images containing geometrical structures and many monochrome areas, such as high contrast images.

At block 107, a description of the pixel crawling path is included in the compressed image file as a comment so that the decompression of the image can be performed (see FIG. 2) by following the pixel crawling path backwards. The pixel crawling path can also be directed top left, bottom right or bottom left. The start position pixel can also be arbitrarily determined or defined. The pixel crawling path could, but need not, be linear. For example, the pixel crawling path could be implemented along any mathematically definable shape or function such as a circle, an ellipse, a spiral, or the like. The size of the pixel can be changed to a dimension other than 1×1. This would be useful, for example, if a structure of 4×4 pixels is repeated over and over again in an image along a certain shape which can be mathematical approximated or described.

Illustratively, one or more than one pixel crawling path can be associated with a given image. In the case of a circular pixel crawling path, the entire image can not covered in one pixel crawling path so the circular pixel crawling path will always be associated with linear pixel paths as well. When encoding or decoding the image, the order which the pixel crawling paths are defined in the image file comment will simply determine how to decode the image.

Figure 2:
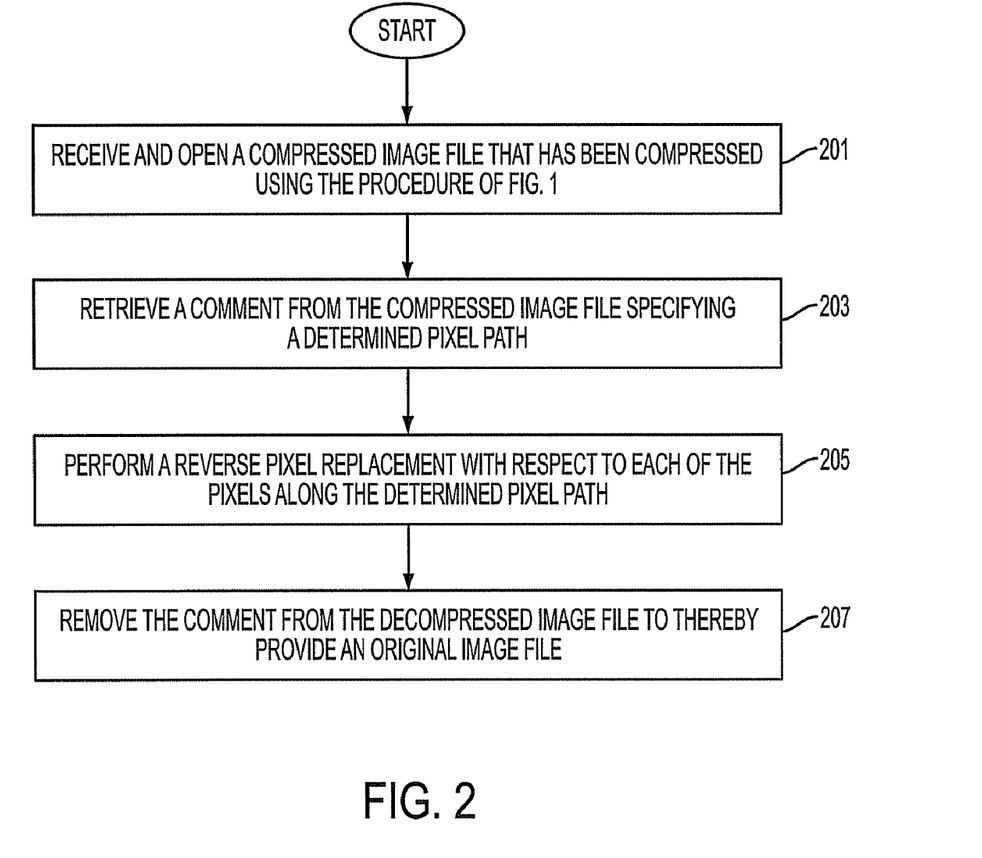
FIG. 2 is a flowchart setting forth an illustrative operational sequence for implementing lossless image decompression.

FIG. 2 is a flowchart setting forth an illustrative operational sequence for implementing lossless image decompression. The procedure commences at block 201 where a compressed image file is received and opened. This compressed image file has been compressed, for example, using the procedure of FIG. 1. Optionally, before the image file is received and opened for decompression, a test will be performed to ascertain whether or not the file is an .ipr file. If the .ipr extension is present and a valid pixel path for decompression exists, then the file can be processed. Next, at block 203 (FIG. 2), a comment is retrieved from the compressed image file specifying a determined pixel path. A reverse pixel replacement is performed with respect to each of the pixels along the determined pixel crawling path (block 205). The comment is removed from the decompressed image file to thereby provide an original image file (block 207).

Figure 3:
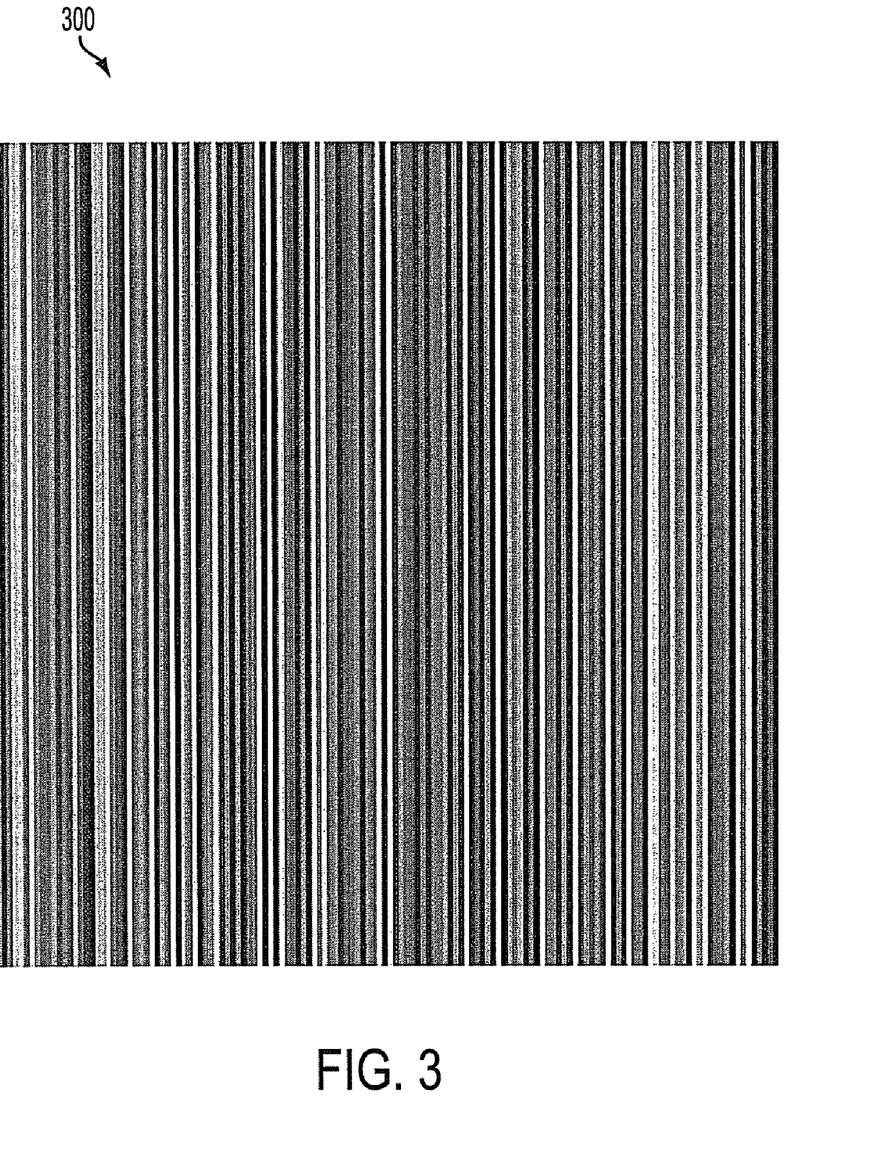
FIG. 3 shows a first illustrative image that is to be compressed using the procedure of FIG. 1.

FIG. 3 shows a first illustrative image 300 that is to be compressed using the procedure of FIG. 1. The illustrative image 300 corresponds to an original image file having a file name of stripes-colored.jpg. Although FIG. 3 is shown as a black and white drawing, it should be understood that the original figure shows a series of colored stripes. Thus, the example of FIG. 3 considers an image having a simple linear structure. Images with geometrical content, high contrast use and same color areas are well suited for compression. The file stripes-colored.jpg is of the type JPEG, has a file size of 24.2 Kb, and the pixel dimensions are 150×150 pixels.

Figure 4:
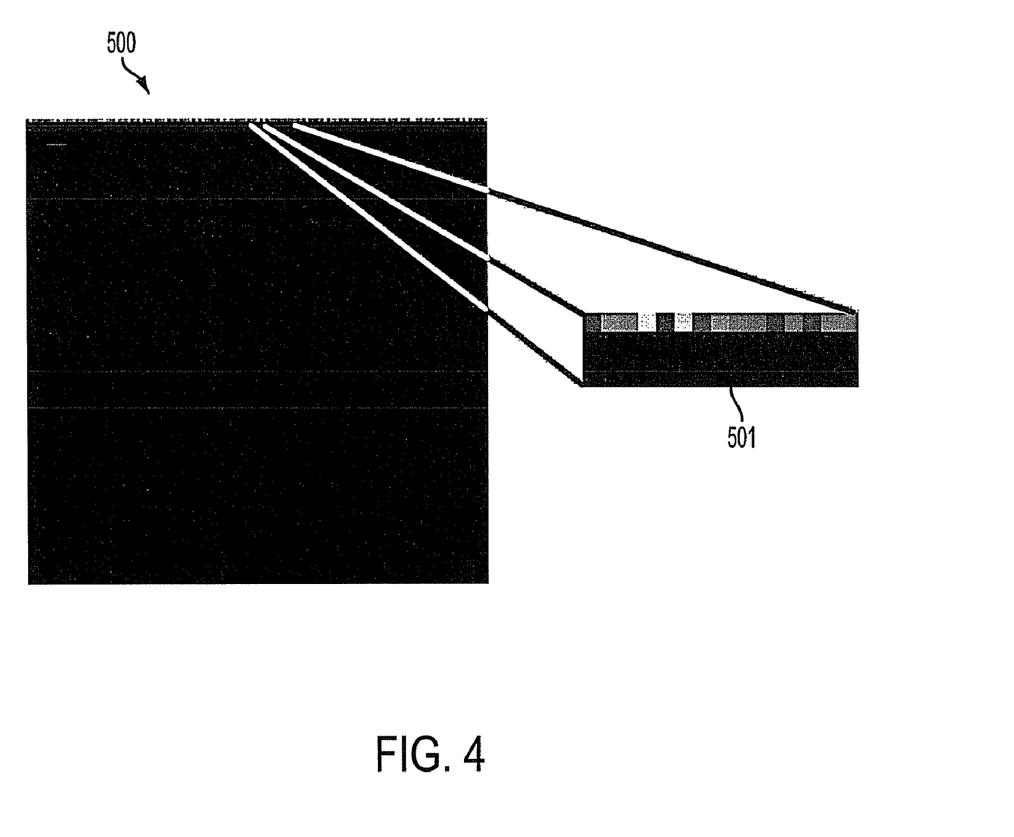
FIG. 4 shows the illustrative image of FIG. 3 after compression is performed in accordance with the procedure of FIG. 1.

FIG. 4 shows the illustrative image 500 of FIG. 3 after compression is performed in accordance with the procedure of FIG. 1. An exploded view of the uppermost row of pixels 501 of FIG. 4 has been provided for explanatory purposes. When the image 300 of FIG. 3 is analysed, the best pixel crawling path is start position top left and moving from top down in every line. This pixel crawling path is described as 0-0x=0 which is inserted in the JPEG as a comment (using the JFIF standard for JPEG file structures the comment marker FFFE is used). Since black is found in the image, the replacement colour RGB(0,0,1) is used. This color is not otherwise present in the image. The resulting image 500 is seen in FIG. 4, representing an IPR version of the JPEG image stripes-colored.jpg of FIG. 3. The resulting image 500 with the pixel path comment has a file size of 6.7 Kb. The image has in other words been compressed with no loss with around 72%. Illustratively, the file could, but need not, be truncated to only include the uppermost row of pixels 501 since the remainder of the image 500 includes a block of black color.

The well known WinZip™ compression would compress the image 300 of FIG. 3 to 2.8 Kb which is even smaller. But when the WinZip™ method is applied to the compressed JPEG by friendly pixel crawling the JPEG is reduced to 4.5 Kb which is even smaller than the original 6.7 Kb. The question is then can the intelligent pixel crawling compression be used together with an existing compression method to perhaps minimize an image even more? The answer is indeed yes. It all depends on the structures in the compressed image. The weakness of the WinZip™ compression is that is does not handle all geometrical shapes equally well. The method of pixel crawling along a path defined by analysis has more freedom to compress the complex structures in the image compared to the WinZip™ method. Let us consider another example.

Figure 5:
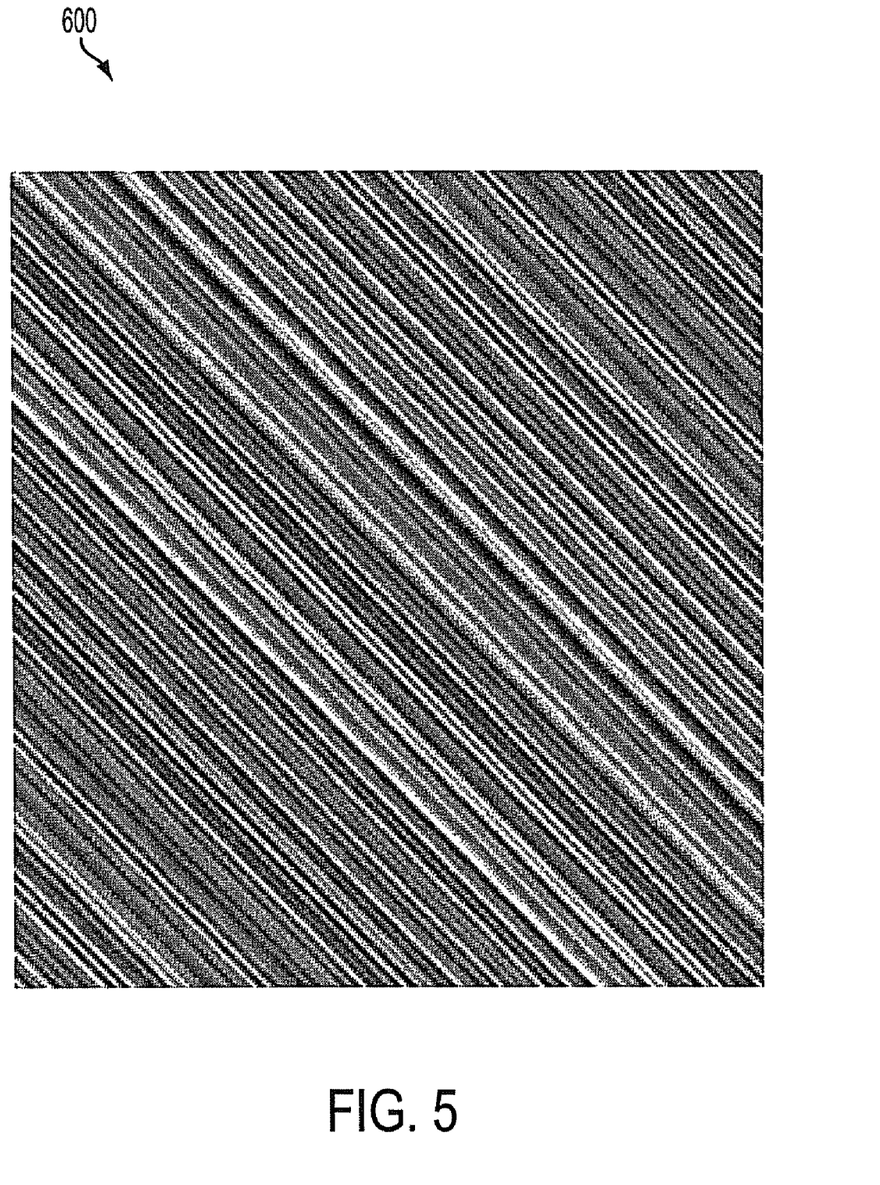
FIG. 5 shows a second illustrative image that is to be compressed using the procedure of FIG. 1.
Figure 6:
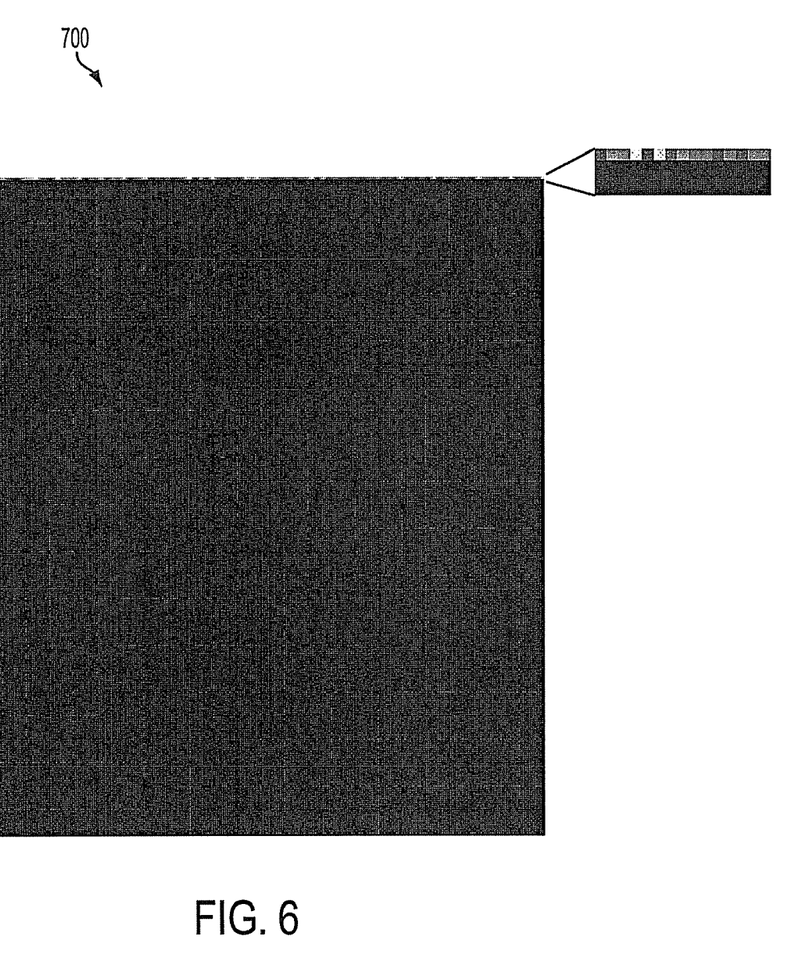
FIG. 6 shows the illustrative image of FIG. 5 after compression is performed in accordance with the procedure of FIG. 1.

FIG. 5 shows a second illustrative image 600 that is to be compressed using the procedure of FIG. 1, and FIG. 6 shows an image 700 representing the image 600 of FIG. 5 after compression is performed in accordance with the procedure of FIG. 1. FIGS. 5 and 6 present examples of images 600, 700 with rotated linear structures. Let us take the image 300 of FIG. 3 and rotate it 45 degrees (see FIG. 6), and then use the IPR method of FIG. 1. The analysis reveals that 100% of the image structure follows the function y=x from the top right and down. Now the image 600 of FIG. 5 will be compressed to form the image 700 of FIG. 6. The pixel path inserted as a comment in the image will be 0-0x=y which describes a structure in the image 700 emerging from the top left corner. The file size of the image 600 (FIG. 5) is 206 Kb with dimensions 600×600 pixels. The image 600 is a JPEG image named 45-stripes-color.jpg having parallel colored lines. When the image 700 has been compressed with IPR as shown in FIG. 6 and encoded with the pixel path, the image size is reduced to 18 Kb. The WinZip™ compression in comparison gives a file with the file size of 201 Kb. Thus, while the IPR method of FIG. 1 compressed the image 600 of FIG. 5 with more than 90% of the original file size, the WinZip™ method only succeeded in compressing less than 3%.

Now that the IPR method has been shown to have the capability of compressing images with certain geometrical structures more efficiently than the WinZip™ method, the full potential of the IPR compression method of FIG. 1 will now be examined. In the previous example described in connection with FIGS. 5 and 6, the pixel crawling path was defined by a simple function f(x)=y originating from the top left corner meaning that the coordinates (0,0) are located top left and the bottom right has the coordinates (N,M) in an image with the dimension N×M. The pixel crawling path function describes the central line from (0,0), and all other pixel crawling paths are simply shifted to the left or right and repeated always from the top left against the bottom right area if the start coordinates in the pixel crawling path definition have been set to (0,0).

If a majority of the image structure is located along lines of f(x)=2y but the start point for IPR should not have been the top left pixel but the bottom left pixel, then the pixel path which should be inserted as a comment in the image file after IPR should be (0,M)x=2y. This would mean that structures move from the bottom left area and up against the top right area. If the starting point is bottom right the start coordinates are (N,M) and if the starting point is top right then the coordinates are (N,0) in an image with dimensions N×M.

Figure 7:
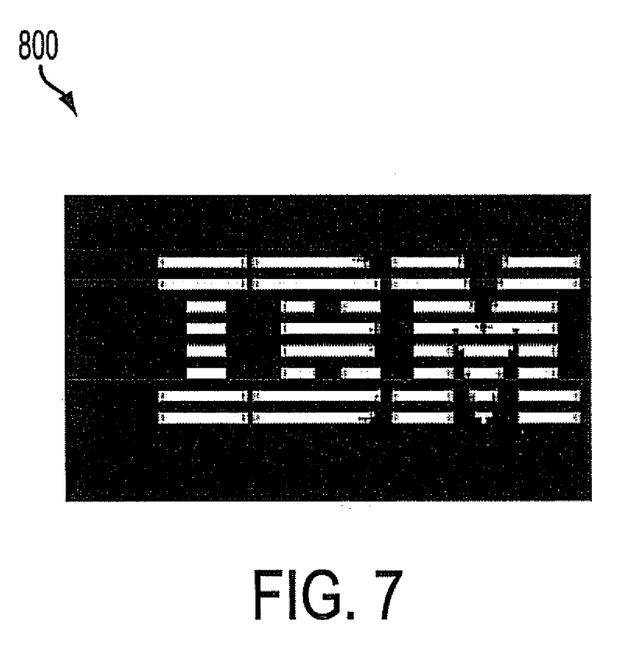
FIG. 7 shows a third illustrative image that is to be compressed using the procedure of FIG. 1.
Figure 8:
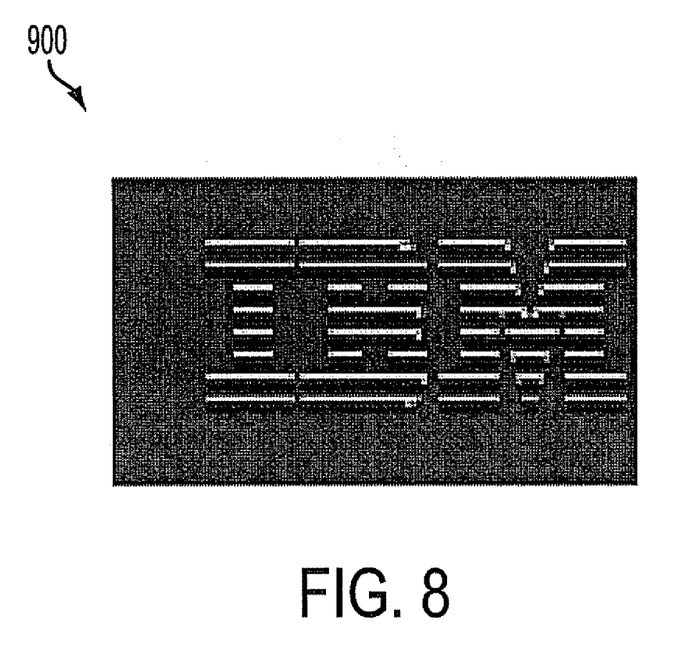
FIG. 8 shows the illustrative image of FIG. 7 after compression is performed in accordance with the procedure of FIG. 1.

FIG. 7 shows a third illustrative image 800 that is to be compressed using the procedure of FIG. 1; and FIG. 8 shows an image 900 representing the illustrative image of FIG. 7 800 after compression is performed in accordance with the procedure of FIG. 1. More specifically, FIG. 7 shows an illustrative IBM logo taken from ibm.com. The file size is 3.89 KB. If the IPR procedure of FIG. 1 is performed from top to bottom, the result is seen in FIG. 8. The replacement color is found to be rgb(17,17,17), a dark color not present in the original image. The image 900 of FIG. 8 is JPEG image with the IBM logo optimized after IPR. The file size is 3.52 KB. The reduction is 9.5%, which is more compression than WinZip™ can offer. WinZip™ can only compress the logo to 3.76 KB.

The method of FIG. 1 could optionally be used when rendering and sending information from a server to browser client. When the web page is being rendered and build only information that differs from the preceding pixel should be sent in full otherwise a predefined special character can be sent for processing.

Figure 9:
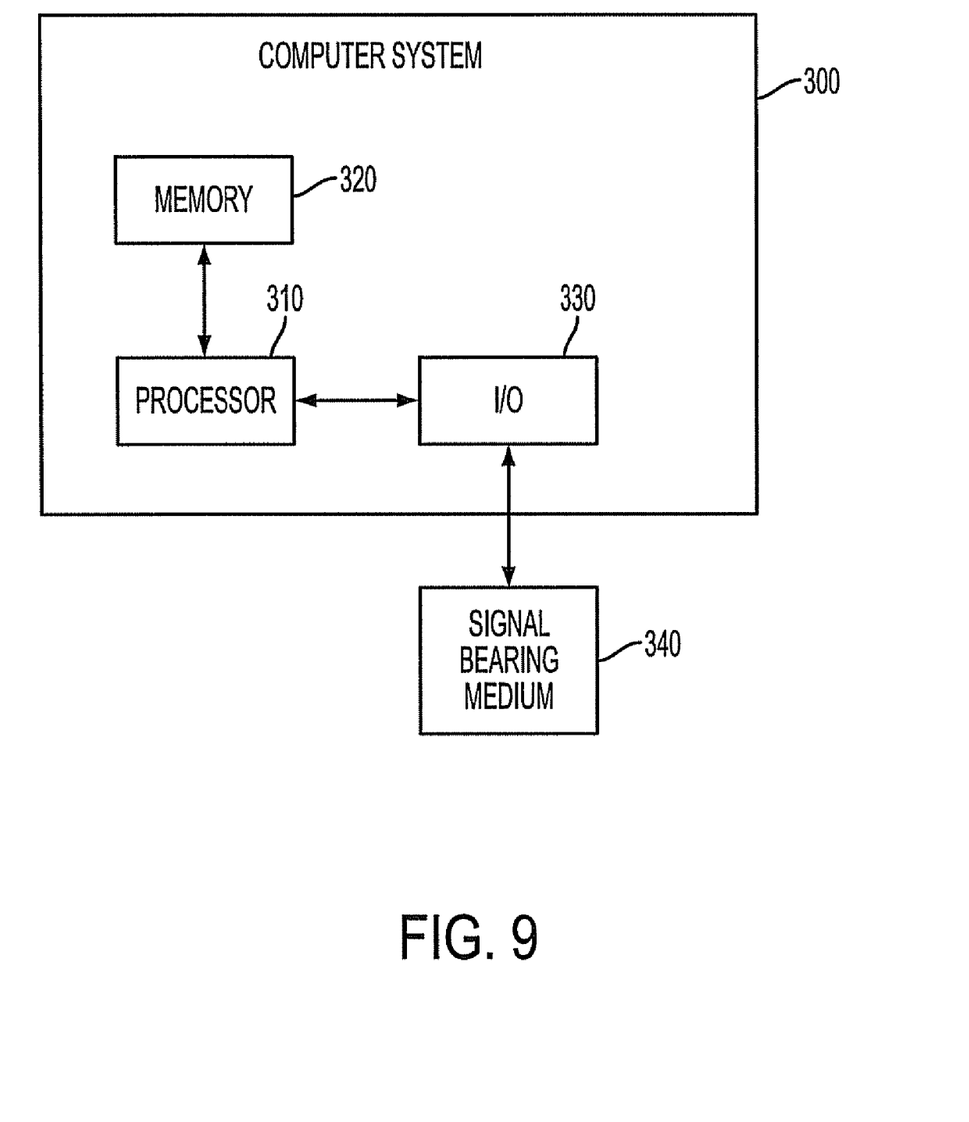
FIG. 9 sets forth an illustrative computer program product for performing lossless image compression.

FIG. 9 sets forth an illustrative computer program product for performing lossless image compression. The system includes a computer 300 operatively coupled to a signal bearing medium 340 via an input/output interface (I/O) 330. The signal bearing medium 340 may include a representation of instructions for performing lossless image compression, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for implementing lossless image compression, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program comprising instructions for implementing lossless image compression. The instructions implement lossless image compression by receiving and opening an original image file representing an image. A pixel path is determined in the image by analyzing one or more complex structures in the image. The one or more complex structures are represented using a mathematical expression. Each of the pixels along the determined pixel path is replaced to minimize the complex structure, thus providing a compressed image file having a smaller file size than the original image file. A comment is inserted in the compressed image file specifying the determined pixel path. The compressed image file is stored on a computer-readable storage medium. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for implementing lossless image compression, the method comprising:
   opening an original image file representing an image;
   determining a pixel crawling path in the image by analyzing one or more complex structures in the image, wherein the one or more complex structures are represented using a mathematical expression;
   replacing each of a plurality of pixels along the determined pixel path to minimize the complex structure, thus providing a compressed image file having a smaller file size than the original image file; and
   inserting a comment in the compressed image file specifying the determined pixel path.

2. The method of claim 1 further comprising performing lossless image decompression by:
   opening a compressed image file;
   retrieving a comment from the compressed image file specifying a determined pixel path;
   performing a reverse pixel replacement with respect to each of the pixels along the determined pixel path; and
   removing the comment is removed from the decompressed image file to thereby provide an original image file.

3. The method of claim 1 wherein the decompressed image file is stored by changing a file extension of the original image file to .ipr.

4. The method of claim 1 further comprising performing a test prior to determining a pixel crawling path in order to ascertain whether or not the original image file is of a valid format and includes no pixel crawling path comment, such that the pixel crawling path is determined only if the original image file is of the valid format and includes no pixel crawling path comment.

5. The method of claim 1 wherein each of the plurality of pixels along the determined pixel crawling path is replaced with a pixel having a predetermined color.

6. The method of claim 5 wherein the predetermined color is selected to be a color that is not present in the original image file.

7. The method of claim 6 wherein the predetermined color is selected to be a color that is closest to the color black.

8. A computer program product comprising a tangible, non-transitory storage medium readable by a processing circuit and storing instructions for execution by the processing circuit for facilitating a method for implementing lossless image compression, the method comprising:
   opening an original image file representing an image;
   determining a pixel crawling path in the image by analyzing one or more complex structures in the image, wherein the one or more complex structures are represented using a mathematical expression;
   replacing each of a plurality of pixels along the determined pixel path to minimize the complex structure, thus providing a compressed image file having a smaller file size than the original image file; and
   inserting a comment in the compressed image file specifying the determined pixel path.

9. The computer program product of claim 8 further comprising instructions for performing lossless image decompression by:
   receiving and opening a compressed image file;
   retrieving a comment from the compressed image file specifying a determined pixel path;
   performing a reverse pixel replacement with respect to each of the pixels along the determined pixel path; and
   removing the comment is removed from the decompressed image file to thereby provide an original image file.

10. The computer program product of claim 8 wherein the file is stored by changing a file extension of the original image file to .ipr.

11. The computer program product of claim 8 further comprising performing a test prior to determining a pixel path in order to ascertain whether or not the original image file is of a valid format and includes no pixel path comment, such that the pixel path is determined only if the original image file is of the valid format and includes no pixel path comment.

12. The computer program product of claim 8 wherein each of the plurality of pixels along the determined pixel path is replaced with a pixel having a predetermined color.

13. The computer program product of claim 12 wherein the predetermined color is selected to be a color that is not present in the original image file.

14. The computer program product of claim 13 wherein the predetermined color is selected to be a color that is closest to black.

15. A hardware product comprising a storage medium readable by a processing circuit and storing instructions for execution by the processing circuit for facilitating a method for implementing lossless image compression, the method comprising:

receiving and opening an original image file representing an image;

determining a pixel path in the image by analyzing one or more complex structures in the image, wherein the one or more complex structures are represented using a mathematical expression;

replacing each of a plurality of pixels along the determined pixel path to minimize the complex structure, thus providing a compressed image file having a smaller file size than the original image file;

inserting a comment in the compressed image file specifying the determined pixel path; and storing the compressed image file on a computer-readable storage medium.

16. The hardware product of claim 15 further comprising instructions for performing lossless image decompression by:

receiving and opening a compressed image file;

retrieving a comment from the compressed image file specifying a determined pixel path;

performing a reverse pixel replacement with respect to each of the pixels along the determined pixel path; and removing the comment is removed from the decompressed image file to thereby provide an original image file.

17. The hardware product of claim 15 wherein the file is stored by changing a file extension of the original image file to .ipr.

18. The hardware product of claim 15 further comprising performing a test prior to determining a pixel path in order to ascertain whether or not the original image file is of a valid format and includes no pixel path comment, such that the pixel path is determined only if the original image file is of the valid format and includes no pixel path comment.

19. The hardware product of claim 15 wherein each of the plurality of pixels along the determined pixel path is replaced with a pixel having a predetermined color.

20. The hardware product of claim 19 wherein the predetermined color is selected to be a color that is not present in the original image file, and wherein the predetermined color is selected to be a color that is closest to black.

* * * * *